June 25, 1940.  R. N. JANEWAY  2,205,478
RAILWAY VEHICLE
Filed Nov. 26, 1937   3 Sheets-Sheet 1
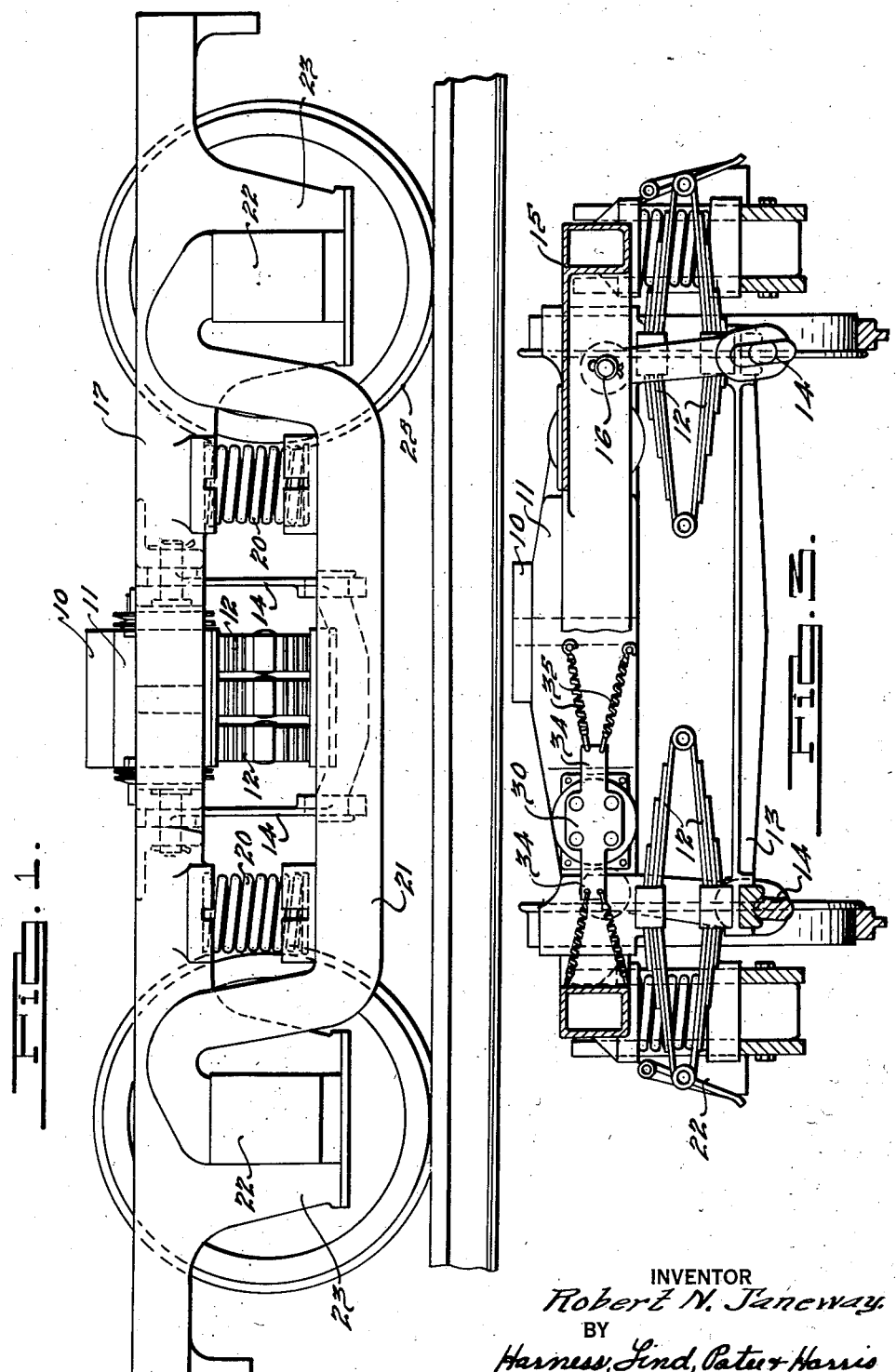
INVENTOR
Robert N. Janeway.
BY
Harness, Lind, Pater & Harris
ATTORNEYS.

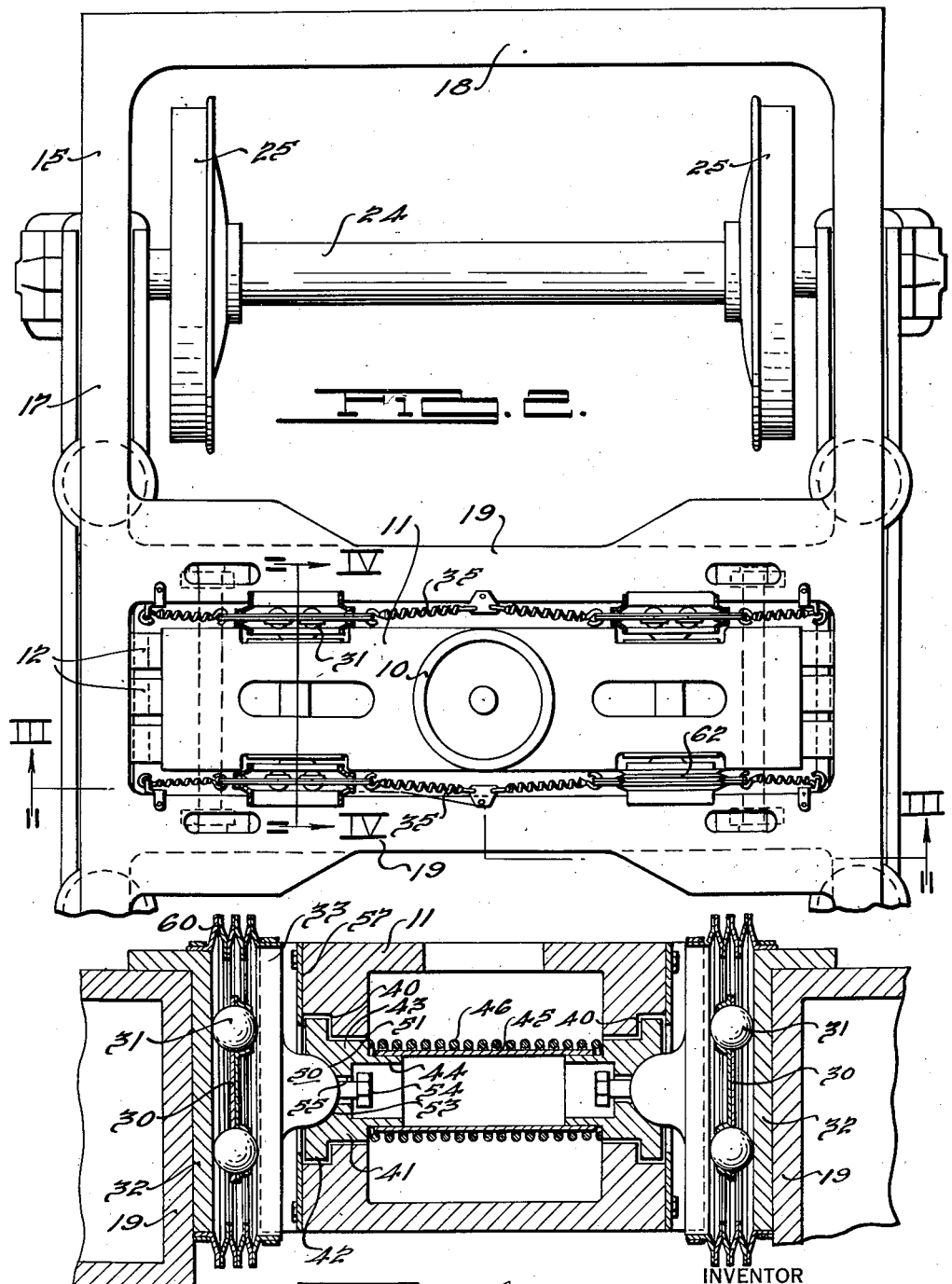

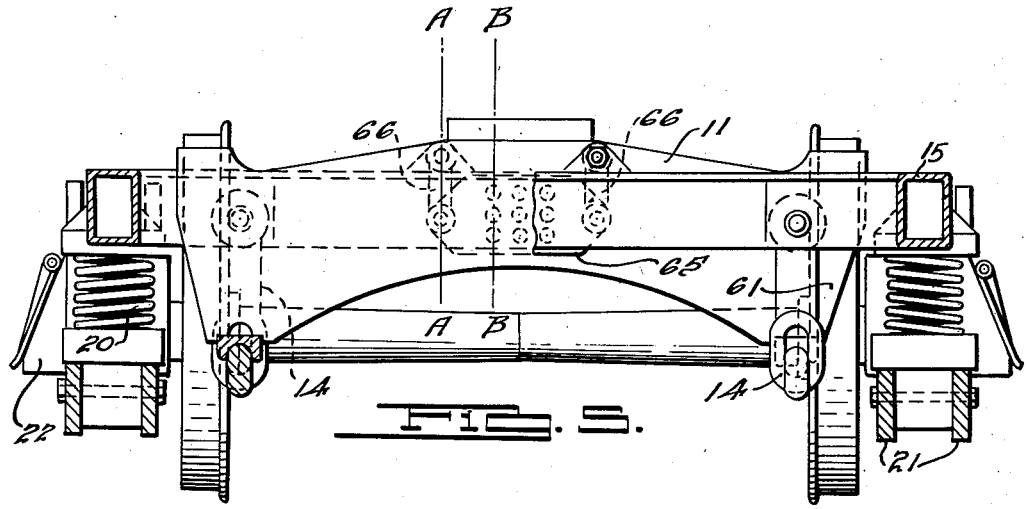
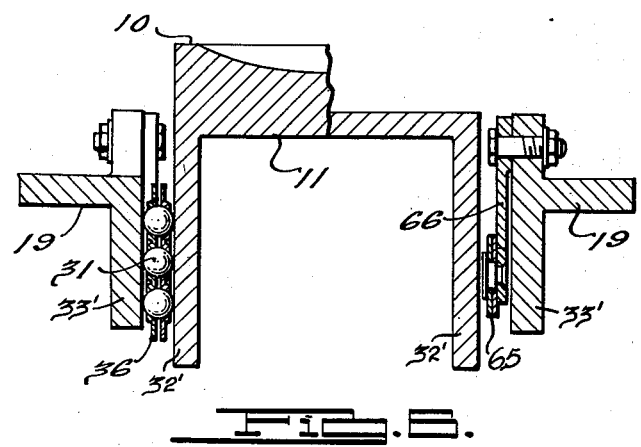

Patented June 25, 1940

2,205,478

UNITED STATES PATENT OFFICE 2,205,478

RAILWAY VEHICLE

Robert N. Janeway, Detroit, Mich., assignor to Chrysler Corporation, Highland Park, Mich., a corporation of Delaware Application November 26, 1937, Serial No. 176,536

13 Claims. (Cl. 105—190)

My invention relates to railway vehicles and it has particular relation to trucks for railway cars.

One object of my invention is to permit free vertical and lateral movement of a truck bolster with respect to its associated truck frame and to prevent relative movement therebetween longitudinally of the truck frame.

Another object of my invention is to provide a thrust bearing adapted for use on railroad car trucks between the car bolster and the truck frame for the purpose of reducing the friction therebetween to a minimum.

A further object of my invention consists in providing means whereby rolling frictional members are interposed between the truck bolster and the adjoining portions of the truck frame to constitute a thrust bearing therebetween, and means whereby said members are maintained in proper operative position therebetween.

For a better understanding of my invention reference may now be had to the accompanying drawings, of which:

Fig. 1 is a side elevational view of a railway passenger truck embodying my invention.

Fig. 2 is a plan view of the truck shown in Fig. 1, portions thereof being shown in section in the interest of clarity.

Fig. 3 is a cross-sectional view of the structure illustrated in Fig. 2, the section being taken along the line III—III thereof.

Fig. 4 is likewise a cross-sectional view of the structure illustrated in Fig. 2, the section being taken along the line IV—IV thereof.

Fig. 5 is a cross-sectional view, quite similar to Fig. 3, illustrating another form which my invention may assume.

Fig. 6 is a cross-sectional view of the structure illustrated in Fig. 5, the sections being taken along the lines A—A and B—B thereof.

As illustrated in the drawings, the car body, not shown, rests upon a center bearing 10, supported upon a truck bolster 11 which, in turn, is supported at its ends upon pairs of elliptical leaf springs 12 which rest upon a transversely extending spring plank 13. The spring plank 13 is supported by the usual swing links 14, the upper ends of which are pivotally supported on a truck frame 15 as illustrated at 16. The truck frame 15 is of the usual type comprising side portions 17 which extend longitudinally of the car body which it supports, two transversely extending end portions 18 and two transversely extending spaced central portions or transoms 19 between which the bolster member 11 is free to move. The truck frame 15 is supported by the usual spaced coil springs 20 which, in turn, rest upon a longitudinally extending equalizer bar 21 the ends of which rest upon journal boxes 22 which are confined, so as to permit vertical movement and prevent longitudinal and lateral movement, by the guide members 23, constituting a portion of the side frame member 17. The journal boxes enclose axles 24 upon which the rail engaging wheels 25 are mounted.

In constructions of this character it is obvious that the bolster member 11 must be free to move vertically and transversely of the truck frame when any force is being transmitted between the truck frame and the car body to which the bolster is secured through the center bearing 10. By my invention I have eliminated to a very large degree all friction between the bolster 11 and any portion of the truck frame including the transom members 11.

As best illustrated in Figs. 2 to 4, inclusive, this is accomplished by disposing a bearing support 30 between each end of the bolster and the adjacent transom members 19. The bearing support 30 has mounted therein ball bearings 31, which are of greater diameter than the thickness of the support 30, and which are adapted to engage a wearing plate 32 rigidly mounted on one of the transom members 19 and a bearing plate 33 movably mounted upon the bolster 11. The ball bearings 31, of which there are preferably four in number, are free to rotate in any direction with respect to the bearing support 30. The bearing support 30 is supported in position by means of two integral transversely extending arms 34, one at each side thereof, to each of which is secured, as best shown in Fig. 3, two springs 35 disposed angularly with respect to the portions 34 and maintained under tension, the opposite ends of the springs 35 being secured to portions of the transom 19. The springs 35 serve to resiliently maintain the bearing support 30 in the proper position but likewise permit it to move in any direction, as may be necessary.

The bolster member 11 is of hollow construction, as illustrated in Fig. 4, and is provided at each end with two aligned openings 40 having portions of two different diameters with the portion of the greater diameter on the external side. Disposed within each opening 40 is a slidable member 41 having an outer portion 42 of greater diameter than an intermediate portion 43, the outer portion 42 being but slightly smaller than the portion of the opening 40 of greater diameter and adapted to fit therein and the portion 43 being of but slightly smaller diameter than the smaller portion of the opening 40, so that they slide therein but fit relatively close. The member 41 is likewise provided with an integral sleeve 44 of smaller diameter than the portion 43, and a longitudinally extending sleeve member 45 serves to bridge the space between and enclose the major portion of the sleeves 44 of the two members 41 disposed one on each side of the bolster member. A coil spring 46 surrounds, and is maintained in proper position by, the sleeve 45 so as to exert a pressure on both of the members 41, serving to move each of them toward the adjacent transom members 19 with their associated wearing plates 32.

Each bearing plate 33 is provided with a centrally disposed projection 50 having a hemispherical outer surface 51 which engages a corresponding hemispherical opening 53 in the member 41. The member 41 thus serves to support the weight of the bearing plate 43 and at the same time permits angular movement thereof in any direction about a point located at the center of the hemispherical surface 51, thus permitting movement of the plate 33 with respect to its support 41 in the manner of a universal joint. The hemispherical portion 50 of the wearing plate 33 is provided with a centrally disposed bolt 54 extending through a centrally disposed opening 55 in the slidable member 41 for assembly purposes. The shank of the bolt 54 is of materially smaller diameter than the opening 55 thus permitting angular movement of the member 50 and its supported wearing plate 43 with respect to the member 41, but, as the head of the bolt 54 is of greater diameter than the opening 55 the member 50 cannot become disassociated from the slidable member 41 during assembly operation.

The bolster member 11 is provided with a side plate 57, provided with a centrally disposed opening of slightly smaller diameter than the diameter of the portion 42 of the member 41 thus preventing the member 41 from moving outwardly from the bolster 11 under pressure of the spring 46 during the assembling operations thereof. It will be noted that the member 41 has a small amount of clearance with respect to the opening 40, thus permitting it to slide lengthwise of the sleeve 45, which is longitudinally of the truck frame, throughout the limited degree of sliding movement permitted by the plate 57 which should be such as to permit the member 41 to maintain the wearing plate 33 at all times in engagement with the ball bearings 31 and to in turn keep them in constant engagement with the wearing plate 32, mounted on a transom member 19.

The purpose of the universal joint between the bearing plate 33 and its supporting member 41 is to permit this plate to adjust itself into parallelism with respect to the wearing plate 32 at all times regardless of any angular movement of the bolster 11 with respect to the transom members 19. The purpose of the spring 46 and the slidable member 41 is to maintain constant engagement between the bearing plate 33 and the ball bearings 31 so that there is no possibility of the plate 33 moving out of engagement with the bearings 31 and subsequently being thrown into engagement therewith by any sudden movement of the bolster with respect to the truck frame. The spring 46 likewise serves to cushion any movement of the bolster toward either of the frame members 19 because such movement will cause movement of the slidable member 41 and compression of the spring 46.

The ball bearings 31 between the bolster 11 and the transoms 19 serve to prevent engagement thereof except through those bearings, thus permitting the frame and bolster to move independently with a minimum of friction, and thus diminishing to a large degree the transmission of disturbing lateral and vertical forces from the frame through the bolster to the car body, it being necessary that all such forces be transmitted through the springs 12 which cushion them when the bolster and truck frame are riding freely with respect to each other.

In order to prevent the admission of dust and dirt between the ball bearings 31 and their cooperating wearing plates 32 and bearing plates 33, and in order to permit the lubrication thereof, these plates are enclosed by means of a flexible bellows member 60 which is secured at each end to each of these members. The bellows member 60 may be made of leather, or correspondingly flexible material, so as not to interfere in any way with relative movement of the plates 32 and 33. The outwardly extending arms 34, by means of which the bearing support 30 is supported, pass through the central portion of the bellows member 60, as best illustrated in Fig. 2, and are secured thereto so as to prevent the admission of dust at that point. This causes no undue strain upon the bellows member because, with the plate 33 moving laterally with respect to the plate 32, the central portion of the bellows will move one half of the distance of movement between the two plates, so that the movement of the bearing support and the central portion of the bellows will at all times be uniform.

In the natural course of events any movement of the bearing plate 33 with respect to the wearing plate 32 will cause a movement of the bearing support 30 in the same direction and to one half of the extent of movement between the plates and the return of the plates 32 and 33 to positions of alignment will return the bearing support to its original centrally disposed position. If for any reason the plates should be moved to a position out of alignment with the central portions of the bearing plates the tension on the springs 35 will be greater on one side than the other which will serve to move the plate to its original central position as soon as the pressure between the plates decreases to a point where such motion is permitted.

In the structure illustrated in Figs. 5 and 6 I have shown a modified form of truck in which the bolster 11 is provided with downwardly extending rigid projections 61 which rest directly on the swing links 14, which are pivotally mounted on the transom members 19. The frame member 15 rests on coil springs 20 which rest on the equalizer bars 21. By reason of the omission of the usual leaf springs between the bolster and the truck frame relative vertical movement therebetween is eliminated, except such vertical movement as arises because of the bolster being suspended on the swing links. With this construction a different type of mounting for the bearing support may be employed. In this form of my invention the bearing support 36 is provided with two laterally extending projections 65, to each of which is pivotally secured a link 66, the upper end of which is pivotally secured to the transom portion 19 of the truck frame 15, the bearing support 36 being supported by means of the links 66. By reason of the pivotal connections of the link 66 to the bearing support 36 and the transom 19 the bearing support is at all times free to move laterally of the bolster member 11, and the gravitational forces of the support and linkage mechanism will serve to return the bearing support 36 to a central position with respect to the plates 32' and 33' in the event that they are not returned thereto by the alignment of these plates. The plates 32' and 33' are, in this embodiment, formed as integral vertical portions or flanges of the bolster 11 and transom portions 19 respectively.

Preferably the links 66 should be one half of the effective length of the swing links 14 so that lateral movement of the bolster with respect to the side frame will permit movement of the supported plate in exact synchronism with the tendency of the ball bearings 31 to move a distance equal to one half of the movement between the bolster and the truck frame, as previously described. With this construction no forces will be imposed upon the ball bearings 31 by means of the supporting links 66 to divert them from their natural course of movement as the plates 32' move with respect to the plates 33'.

With this construction only one bearing support 36 need be employed on each side of the bolster member 11, in which event that support should be positioned centrally of the length of the bolster.

In Fig. 6, which for the sake of clarity represents two different vertical sections in one figure, the ball bearings are illustrated as engaging directly with the aforesaid vertical flanges 33' and 32' on the transoms and bolster, which may be used if desired, or the same type of support for the bearing support 36 may be employed with replaceable wear plates 32 and the slidable angularly adjustable bearing plates 33, as shown in Fig. 4, if desired.

Although I have illustrated but two forms which my invention may assume and have described but a single application thereof, it will be apparent to those skilled in the art that my invention is not so limited but that various modifications and changes may be effected therein without departing from the spirit of my invention or from the scope of the appended claims.

I claim:

1. In a railway vehicle truck, a transversely extending bolster member, a truck frame having transversely extending members disposed lengthwise of and on each side of said bolster member, a thrust bearing plate disposed intermediate said bolster member and one of said frame members and adapted to transmit thrust forces therebetween, thrust-transmitting means movably carried by one of said members and providing universal pivotal mounting for said thrust bearing plate, and yielding means urging movement of said thrust-transmitting means relative to the member which carries said thrust-transmitting means.

2. In a railway vehicle truck, a truck frame, a relatively movable truck bolster member disposed intermediate two substantially vertically extending portions of said truck frame, a bearing supporting member disposed intermediate said bolster member and the adjacent substantially vertically extending portions of the truck frame, and bearing members rotatively mounted on said bearing supporting member and adapted to engage and roll between the surfaces of said bolster member and the substantially vertically extending portions of said truck frame.

3. In a railway vehicle truck, a truck frame, a relatively movable truck bolster member disposed intermediate portions of said truck frame having substantially vertically extending faces, a bearing supporting member disposed intermediate said bolster member and the substantially vertically extending faces of the adjacent portions of the truck frame and provided with rotatable bearing members adapted to engage and roll between the adjacent surfaces of said bolster member and the substantially vertically extending faces of said truck frame, and means for yieldingly maintaining said bearing supporting member in proper operative position between said bolster member and said truck frame.

4. In a railway vehicle truck, a truck frame, a relatively movable truck bolster member disposed intermediate portions of said truck frame having substantially vertically extending faces, a bearing supporting member disposed intermediate said bolster member and the substantially vertically extending faces of the adjacent portions of the truck frame and provided with rotatable bearing members adapted to engage and roll between the adjacent surfaces of said bolster member and said substantially vertically extending faces of the truck frame, means for maintaining said bearing supporting member in proper operative position between said bolster member and the adjacent portion of the truck frame, and means for maintaining constant engagement between said rotatable bearing members and the adjacent surfaces of said bolster member and said truck frame.

5. In a railway vehicle truck, a truck frame, a relatively movable truck bolster member disposed intermediate portions of said truck frame, a bearing plate mounted on said bolster member, rotatable bearing members disposed intermediate the adjacent surface of said truck frame and said bearing plate, means mounted on said bolster member for resiliently urging said bearing plate into engagement with said rotatable bearing members.

6. In a railway vehicle truck, a truck frame, a relatively movable truck bolster member disposed intermediate portions of said truck frame, a bearing plate mounted on each side of said bolster member, anti-friction bearing members disposed intermediate said bearing plates and adjacent surfaces on said truck frames, means mounted on said bolster supporting said bearing plates and adapted to permit a universal joint type of movement with respect thereto, and spring means engaging both of said bearing plate supporting members and resiliently urging said bearing plates into engagement with said anti-friction bearing members.

7. In a railway vehicle truck, a truck frame, a relatively movable truck bolster member disposed intermediate portions of said truck frame, said truck frame portions having substantially vertically extending surfaces, a bearing support mounted intermediate said bolster member and at least one of the substantially vertically extending surfaces of the adjacent truck frame portions, bearings rotatably mounted on said support, said bearings being greater in diameter than the thickness of said support and adapted to engage and roll between said bolster member and the last said substantially vertically extending surface of the adjacent truck frame portion, and means adapted to support said bearing support in operative position intermediate said bolster member and the last said truck frame portions comprising a plurality of links each pivotally secured to said truck frame at one end and pivotally secured to the bearing support at the other end.

8. In a railway vehicle truck, a truck frame, a relatively movable truck bolster member disposed intermediate portions of said truck frame, said truck frame portions having substantially vertically extending surfaces, a bearing support mounted intermediate said bolster member and at least one of the substantially vertically extending surfaces of the adjacent truck frame portions, bearings rotatably mounted on said support, said bearings being greater in diameter than the thickness of said support and adapted to engage and roll between said bolster member and the last said substantially vertically extending surface of the adjacent truck frame portion, and means adapted to support said bearing support in operative position intermediate said bolster member and the last said truck frame portions comprising two spaced parallel links each pivotally secured at one end to one side of said support and pivotally secured at the other end to the truck frame member.

9. In a railway vehicle truck, a truck frame, a truck bolster movable relative to the truck frame and disposed intermediate laterally extending portions of said truck frame, and anti-friction ball members disposed on both front and rear sides of said bolster member intermediate said bolster member and the truck frame, said anti-friction ball members operating to guide movement of said bolster member laterally and vertically relative to the truck member.

10. In a railway vehicle truck, a truck frame provided with spaced members each having a substantially vertically extending surface, a relatively movable truck bolster member disposed intermediate said truck frame members, a bearing support mounted intermediate said bolster member and an adjacent substantially vertically extending surface of one of said truck frame members, bearings rotatably mounted on said support, said bearings being greater in diameter than the thickness of said support and adapted to engage and roll between said bolster member and said adjacent substantially vertically extending surface of the last said truck frame member, and means for maintaining said bearing support in operative position relative to said bolster member and the last said truck frame member and movable with respect to both of these members.

11. In a railway vehicle truck, a truck frame provided with spaced members each having a substantially vertically extending surface, a relatively movable truck bolster member disposed intermediate said truck frame members, a bearing support mounted intermediate said bolster member and an adjacent substantially vertically extending surface of one of said truck frame members, bearings rotatably mounted on said support, said bearings being greater in diameter than the thickness of said support and adapted to engage and roll between said bolster member and said adjacent substantially vertically extending surface of the last said truck frame member, and means mounted on the last said truck frame member adapted to support said bearing support in movable relationship with respect to said bolster member and the last said truck frame member.

12. In a railway vehicle truck, a truck frame having spaced members one being provided with a substantially vertical surface, a relatively movable truck bolster member disposed intermediate said truck frame members and having a substantially vertical surface adjacent said surface of said one truck frame member, a bearing support mounted intermediate said substantially vertical surfaces, bearings rotatively mounted on said support, said bearings being greater in diameter than the thickness of said support and adapted to engage the adjacent substantially vertical surfaces of said bolster member and said one truck frame member, and means adapted to support said bearing support in operative position intermediate said bolster member and said one truck frame member comprising a plurality of spring members engaging said support and exerting opposed forces thereon.

13. In a railway vehicle truck, a truck frame having spaced members one being provided with a substantially vertical surface, a relatively movable truck bolster member disposed intermediate said truck frame members and having a substantially vertical surface adjacent said surface of said one truck frame member, a bearing support mounted intermediate said substantially vertical surfaces, bearings rotatively mounted on said support, said bearings being greater in diameter than the thickness of said support and adapted to engage the adjacent substantially vertical surfaces of said bolster member and said one truck frame member, and means adapted to support said bearing support in operative position intermediate said bolster member and said one truck frame member comprising a plurality of springs secured at one of their ends to opposite sides of said support and secured at their other ends to said one truck frame member.

ROBERT N. JANEWAY.